United States Patent
Groos et al.

(10) Patent No.: US 7,192,561 B2
(45) Date of Patent: Mar. 20, 2007

(54) HYDRAULICALLY CONTROLLED PRESSURE RELIEF VALVE FOR HIGH-PRESSURE REACTORS

(75) Inventors: Georg Groos, Dannstadt-Schauernheim (DE); Klaus Hammer, Mutterstadt (DE)

(73) Assignee: Basell Polyolefine GmbH, Wesseling (DE)

( * ) Notice: Subject to any disclaimer, the term of this patent is extended or adjusted under 35 U.S.C. 154(b) by 398 days.

(21) Appl. No.: 10/312,536

(22) PCT Filed: Jun. 20, 2001

(86) PCT No.: PCT/EP01/06933

§ 371 (c)(1),
(2), (4) Date: Jun. 4, 2003

(87) PCT Pub. No.: WO02/01308

PCT Pub. Date: Jan. 3, 2002

(65) Prior Publication Data

US 2004/0013588 A1 Jan. 22, 2004

(30) Foreign Application Priority Data

Jun. 29, 2000 (DE) .............................. 100 31 586

(51) Int. Cl.
*B32B 5/02* (2006.01)
*B32B 27/04* (2006.01)

(52) U.S. Cl. ................. 422/112; 422/113; 422/118; 422/295; 422/296

(58) Field of Classification Search ........... 422/112, 422/118, 129, 242, 109
See application file for complete search history.

(56) References Cited

U.S. PATENT DOCUMENTS

| 4,550,747 A | * | 11/1985 | Woodworth et al. ...... 137/487.5 |
| 5,026,527 A | | 6/1991 | Krijgsman ................ 422/110 |
| 5,054,517 A | * | 10/1991 | Liesenhoff et al. ...... 137/513.5 |
| 5,149,507 A | * | 9/1992 | Ellis, Jr. .................. 422/112 |
| 5,533,551 A | | 7/1996 | Grancher ............... 137/625.62 |

FOREIGN PATENT DOCUMENTS

EP 0 540 915 5/1993

OTHER PUBLICATIONS

*Bonsel et al., 67 *Chem. Ing. Tech.* 862-964 (1995).

* cited by examiner

*Primary Examiner*—N. Bhat
(74) *Attorney, Agent, or Firm*—James C. Lydon

(57) ABSTRACT

A high-pressure reactor which has a hydraulically controlled pressure-relief valve. The mechanical design of the corresponding hydraulic system in combination with the control technology used facilitates particularly fast opening of the pressure-relief valve in the case of pressure or temperature jumps in the high-pressure reactor.

10 Claims, 4 Drawing Sheets

HYDRAULICALLY CONTROLLED PRESSURE RELIEF VALVE FOR HIGH-PRESSURE REACTORS

This application is a U.S. National Stage of International application PCT/EP01/06933, filed Jun. 20, 2001.

The invention relates to an apparatus which contains a high-pressure reactor having a hydraulically controlled pressure-relief valve.

Compared with low- and medium-pressure polyethylene, high-pressure polyethylene has a higher degree of branching, a lower crystalline content, a lower melting range and lower density. In the high-pressure process, ethene is subjected to free-radical polymerization at temperatures between about 150 and 300° C. at a pressure in the range from about 1500 to 4000 bar. Oxygen or small amounts of peroxides are usually added as free-radical initiator. The corresponding reactor may be designed as a stirred-tank reactor or preferably as a flow tube. A suitable tubular reactor normally has a length of from several hundred to a few thousand meters and is surrounded on the outside by a heating or cooling jacket. Owing to the high internal pressure in the reactor, the walls of the tubular reactor, which are made of metal, typically have a thickness in the order of a few cm.

Technical problems in the high-pressure process are explained in "Chem-Ing.-Tech. 67 (1995) No. 7, pages 862 to 864, Verlag VCH-Verlagsgesellschaft GmbH Weinheim". Thus, it is stated that ethene decomposes rapidly in an explosive manner under certain temperature and pressure conditions to give soot, methane and hydrogen. This undesired reaction occurs repeatedly, in particular in the high-pressure polymerization of ethene. The drastic increase in pressure and temperature associated therewith represents a considerable potential risk for the operational safety of the production plants.

One possible solution for preventing a drastic increase in pressure and temperature of this type consists in installing rupture discs in the tubular reactor. However, the disadvantage of rupture discs of this type is that, at the high pressures prevailing, they do not react to relatively small pressure variations—this means that rupture discs may burst in an undesired manner within the range of the usual operating pressures. A further significant disadvantage of rupture discs is that they do not respond to increases in temperature. As an alternative to rupture discs, it is possible to employ so-called emergency T-valves (pressure-relief valves). Pressure-relief valves of this type are opened or closed by a hydraulic control mechanism. Since such a hydraulic control mechanism is relatively slow to react, correspondingly low opening speeds result for the corresponding pressure-relief valves.

The object of the present invention is thus to provide a high-pressure reactor in which the occurrence of sudden pressure or temperature increases causes particularly rapid relief (decompression or temperature reduction). The relief of the reactor should be reliable and take place at a sufficiently high speed.

This object is then achieved by an apparatus containing
a) a high-pressure reactor having an internal volume of from 0.4 to 20 m$^3$ and an internal pressure of from 1000 to 5000 bar,
b) measurement devices for determining pressure and/or temperature in the high-pressure reactor,
c) an electronic control system,
d) a hydraulic control unit having one or more valves,
e) a hydraulic system containing a hydraulic cylinder having a movable piston mass, and a pressure-relief valve located on the high-pressure reactor and controlled by the hydraulic cylinder, and
f) connecting lines between the hydraulic control unit and the hydraulic system which are provided for conveying hydraulic fluid, where if a prespecified temperature or a prespecified pressure is exceeded in the high-pressure reactor, a measurement device transmits a signal to the electronic control system, which then effects the opening of one or more valves of the hydraulic control unit, causing hydraulic fluid to be forced through one or more connecting lines in the direction of the movable piston mass of the hydraulic cylinder, the movable piston mass is moved thereby, where at least one of the connecting lines has on average an internal diameter of from 10 to 80 mm, this at least one connecting line has an internal pressure of from 100 to 500 bar, and the movable piston mass weighs from 10 to 80 kg.

The high-pressure reactor is generally designed as a tubular reactor, but can also be designed as a high-pressure autoclave. The high-pressure reactor is usually employed for the production of ethylene polymers. Suitable measurement devices for the determination of temperature or pressure are commercially available sensors. The movable piston mass is taken to mean the part of the hydraulic cylinder which is moved by the hydraulic fluid during closing or opening of the pressure-relief valve. The movable piston mass usually comprises the hydraulic piston and a corresponding valve spindle. The connecting lines provided for conveying hydraulic fluid are preferably designed as tubes.

The main advantage of the present invention is that pressure jumps in the high-pressure reactor can be relieved extremely quickly. The magnitude of the corresponding opening operation for the pressure-relief valve is only about 50 ms. In contrast to known pressure-relief systems, this is sufficiently fast for reliable relief (decompression or temperature reduction) of the high-pressure reactor. A further essential advantage of the invention is that the pressure relief can be initiated both by pressure and temperature jumps.

Fast and reliable relief of the reactor is also achieved, inter alia, through the pressure-relief valves having a seat cross section which is generally at least about 350 mm$^2$ per m$^3$ of reactor volume. In the temperature maxima of the reactor, wherever possible up to 800 mm$^2$ of seat cross section per m$^3$ of reactor volume should be implemented.

The internal volume of the high-pressure reactor is usually from 1 to 15 m$^3$. The preferred internal pressure of the high-pressure reactor is from 2000 to 3500 bar.

At least one connecting line between the hydraulic control unit and the hydraulic system usually has on average an internal diameter of from 20 to 50 mm—preferably, all connecting lines situated between the hydraulic control unit and the hydraulic system have on average an internal diameter of from 20 to 50 mm. The at least one connecting line generally has an internal pressure of from 150 to 250 bar—usually, all connecting lines situated between the hydraulic control unit and the hydraulic system have an internal pressure of from 150 to 250 bar. In a preferred embodiment of the invention, two connecting lines provided for conveying hydraulic fluid are arranged between the hydraulic control unit and the hydraulic system. One of these connecting lines carries hydraulic fluid to the hydraulic control unit, the corresponding other from the hydraulic control unit to the hydraulic system.

The movable piston mass preferably weighs from 15 to 50 kg.

In a preferred embodiment of the invention, a connecting line, or the connecting line through which hydraulic fluid is conveyed from the hydraulic system in the direction of the hydraulic control unit during the opening of the pressure-relief valve, is fitted with a one-way restrictor. The one-way restrictor is able to eliminate the disadvantage that the corresponding valve seat fittings are damaged during the closing operation of the pressure-relief valve. The installation of the one-way restrictor enables the speed of the closing operation to be adjusted—in general, a closing time of about 2 s proves successful. The one-way restrictor thus enables rapid opening and delayed closing of the pressure-relief valve, promoting long service lives of the "pressure-relief system".

In general, one or more valves of the hydraulic control unit are designed as sliding valves with ball seat actuation.

The pressure-relief valve is preferably opened by moving the movable piston mass either toward or preferably away from the pressure-relief valve.

In the attached drawing,

FIG. 1 diagrammatically shows one embodiment of the apparatus according to the invention.

Figure 1:
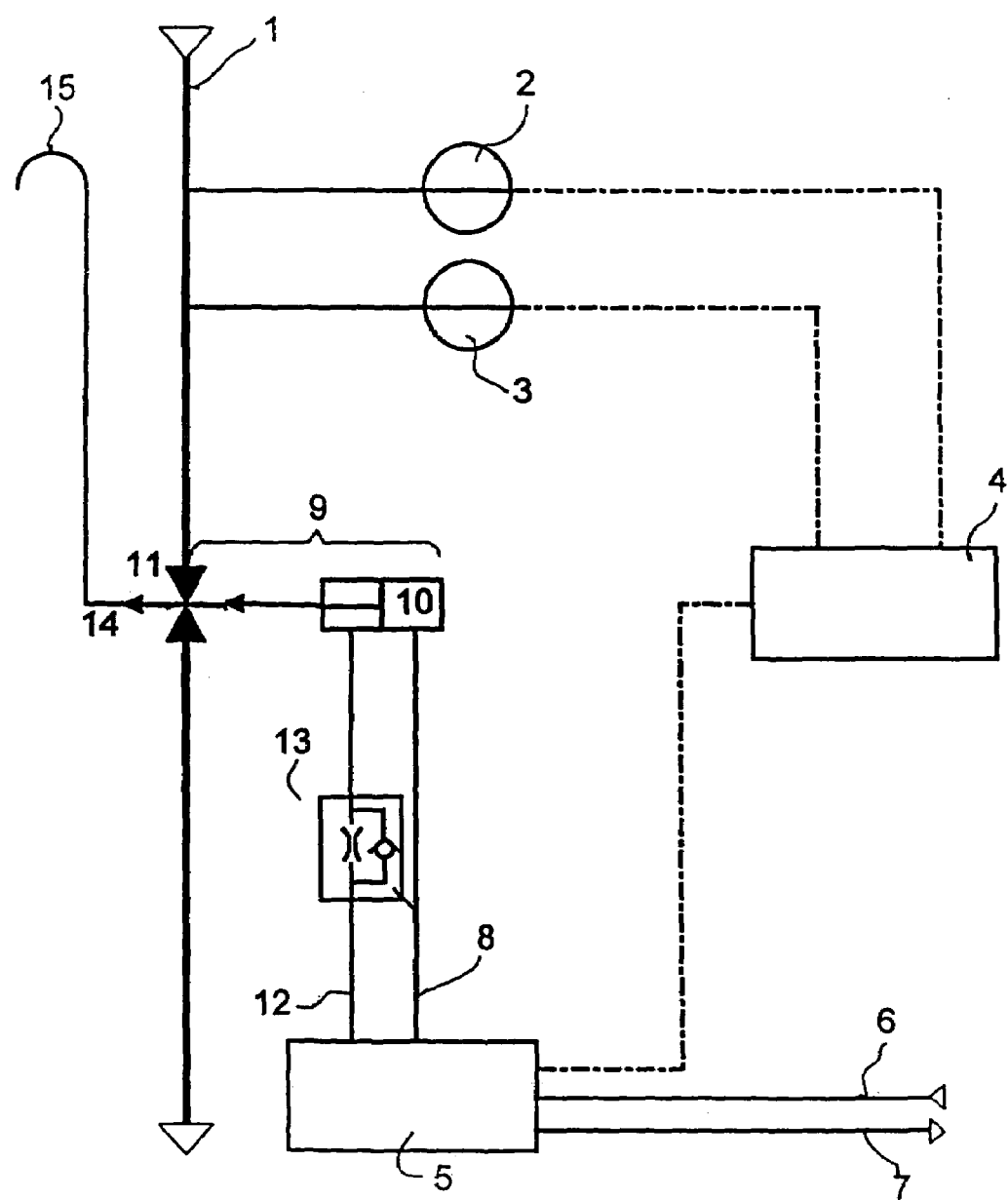

FIG. 1 shows a high-pressure reactor 1, on which a measurement device 2 for the pressure and a measurement device 3 for the temperature are arranged. If a prespecified temperature or a prespecified pressure is exceeded, an electronic signal is transmitted from the measurement devices 2, 3 to the electronic control system 4. The latter transmits an electronic signal to the hydraulic control unit 5. A feed tube 6 and a return tube 7 for hydraulic fluid are attached to the hydraulic control unit. A suitable hydraulic fluid is normally commercially available hydraulic oil. The signal reaching the hydraulic control unit 5 causes the opening of one or more valves of the hydraulic control unit 5. Hydraulic fluid is thereby forced through the connecting line 8, which is in the form of a tube, in the direction of the hydraulic system 9. The movable piston mass 10 is thereby moved, causing the pressure-relief valve 11 to be opened. In order to close the pressure-relief valve 11, hydraulic fluid is forced through the connecting line 12, which is in the form of a tube, via the one-way restrictor 13 in the direction of the hydraulic system 9.

The outlet 14 of the pressure-relief valve 11 is provided with a high-level pot 15 for the separation of solid (for example polyethylene). The connecting lines 8, 12 have an internal diameter of from 10 to 80 mm, preferably from 20 to 50 mm. The pressure therein is from 100 to 500 bar, preferably from 150 to 250 bar.

Figure 2:
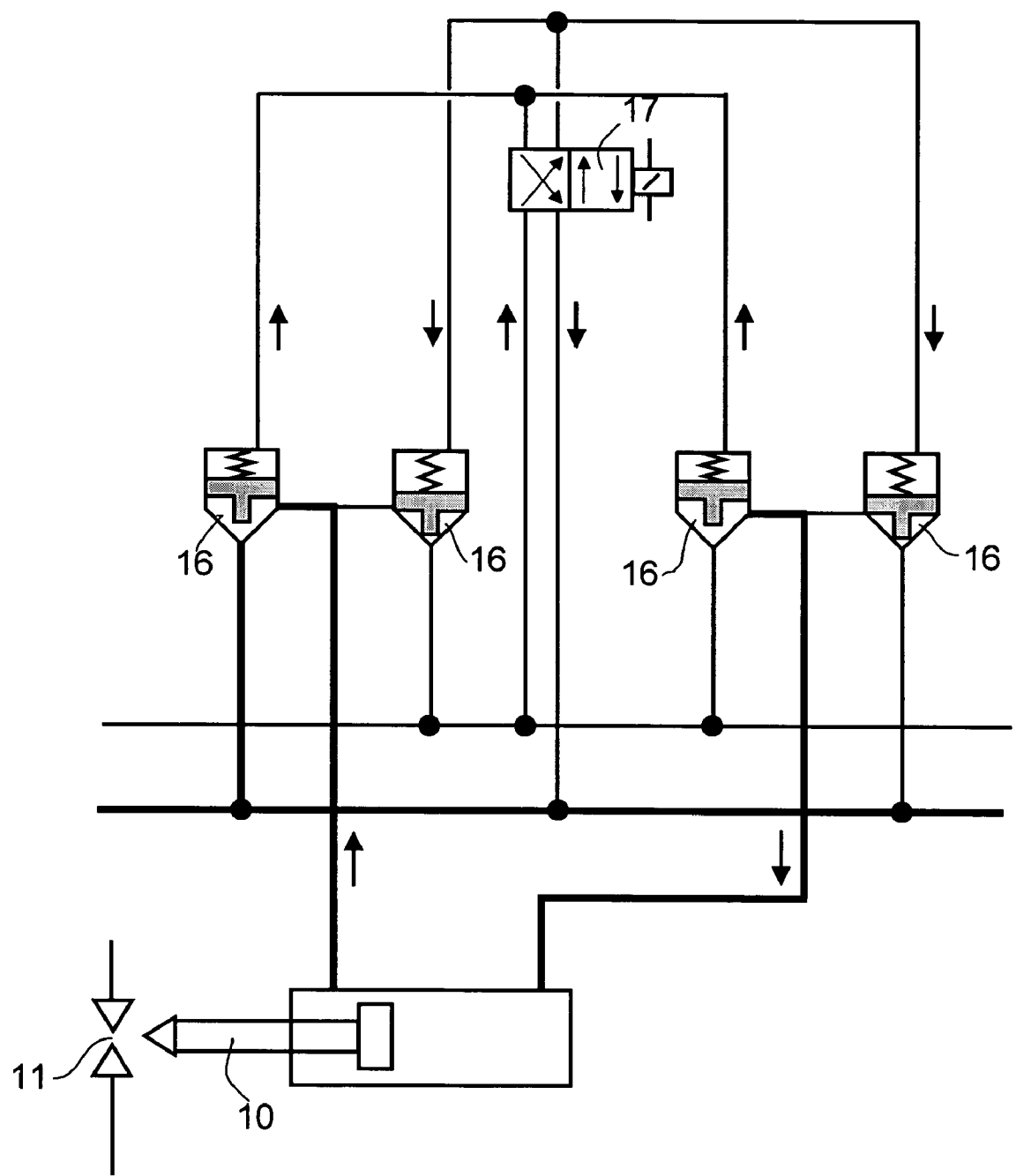
FIG. 2 shows a diagram illustrating the mode of functioning of the hydraulic control unit in combination with the hydraulic system state with the pressure-relief valve closed.
Figure 3:
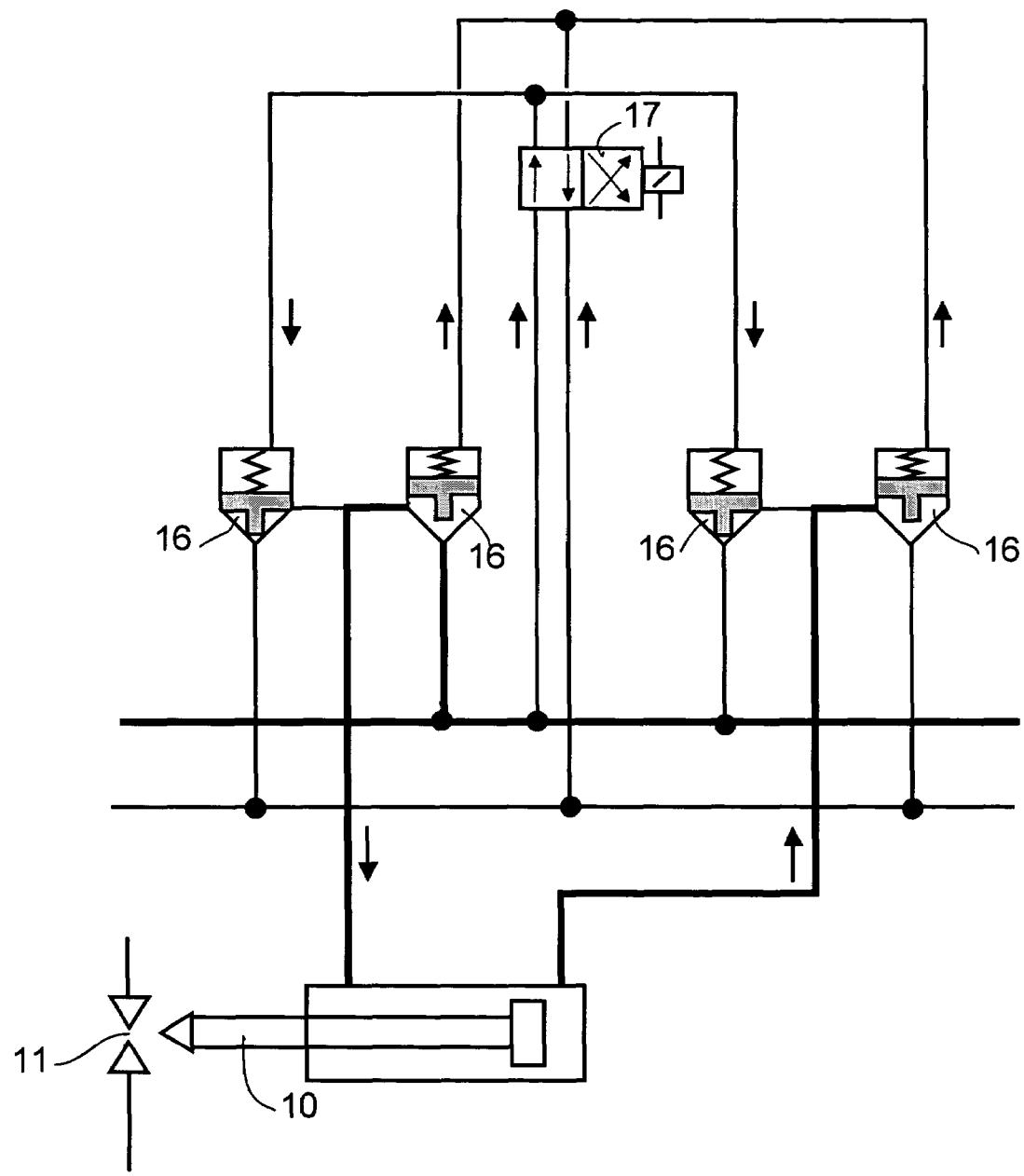
FIG. 3 shows a functional diagram of the hydraulic control unit in combination with the hydraulic system—with the pressure-relief valve open ("emergency setting").

FIG. 2 and FIG. 3 show a specially designed hydraulic control unit 5, which has four sliding valves 16 with ball seat actuation and a corresponding ball seat valve 17. The flow or "force directions" of the hydraulic fluid indicated specify whether the pressure-relief valve 11 is kept shut or closed (FIG. 2) or opened or kept open (FIG. 3) by the movable piston mass 10. FIG. 2 thus shows diagrammatically the normal operating procedure and FIG. 3 the "emergency setting".

Figure 4:
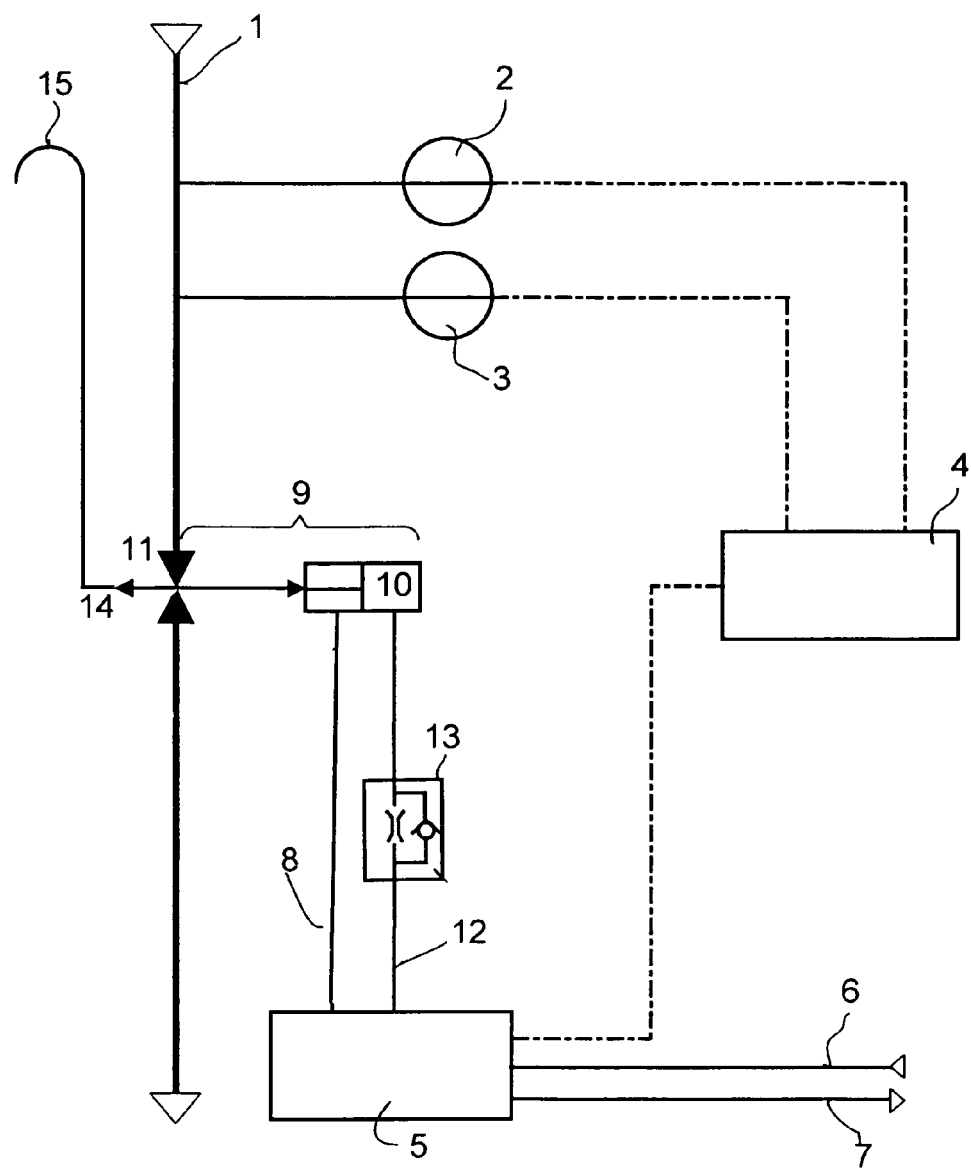
FIG. 4 shows a second embodiment of the apparatus according to the invention.

FIG. 4 illustrates a second embodiment of the apparatus according to the invention, on which a measurement device 2 for the pressure and a measurement device for the temperature are arranged on high-pressure reactor 1. As in the first embodiment, if a prespecified temperature or a prespecified pressure is exceeded, an electronic signal is transmitted from the measurement devices 2,3 to an electronic control system 4. The latter transmits an electronic signal to a hydraulic control unit 5. A feed tube 6 and a return tube 7 for hydraulic fluid are attached to the hydraulic control unit. A suitable hydraulic fluid is normally commercially available hydraulic oil. The signal reaching the hydraulic control unit 5 causes the opening of one or more valves of the hydraulic control unit 5. Hydraulic fluid is thereby forced through the connecting line 8, which is in the form of a tube, in the direction of the hydraulic system 9. The moveable piston mass 10 is thereby moved, causing the pressure-relief valve 11 to be opened. In order to close the pressure-relief valve 11, hydraulic fluid is forced through the connecting line 12, which is in the form of a tube, via the one-way restrictor 13 in the direction of the hydraulic system 9. The outlet 14 of the pressure-relief valve 11 is provided with a high level pot 15 for the separation of solid (for example polyethylene). The connecting lines 8, 12 have an internal diameter of from 10 to 80 mm, preferably from 20 to 50 mm. The pressure therein is from 100 to 500 bar, preferably from 150 to 250 bar.

The invention claimed is:

1. Apparatus comprising
   1) a high-pressure reactor having an internal volume of from 0.4 to 20 $m^3$ and capable of operating at an internal pressure of from 1000 to 5000 bar,
   2) measurement devices for determining pressure and/or temperature in the high-pressure reactor,
   3) an electronic control system,
   4) a hydraulic control unit having one or more valves,
   5) a hydraulic system containing a hydraulic cylinder having a movable piston mass, and a pressure-relief valve located on the high-pressure reactor and controlled by the hydraulic cylinder, and
   6) connecting lines between the hydraulic control unit and the hydraulic system which are provided for conveying hydraulic fluid, wherein
      if a prespecified temperature or a prespecified pressure is exceeded in the high-pressure reactor, a measurement device transmits a signal to the electronic control system, which then effects the opening of one or more valves of the hydraulic control unit, causing hydraulic fluid to be forced through one or more connecting lines in the direction of the movable piston mass of the hydraulic cylinder, the movable piston mass is moved thereby, causing the pressure-relief valve to be opened, where at least one of the connecting lines has on average an internal diameter of from 10 to 80 mm, this at least one connecting line has an internal pressure of from 100 to 500 bar, and the movable piston mass weighs from 10 to 80 kg.

2. The apparatus of claim 1, wherein the high-pressure reactor has an internal volume of from 1 to 15 $m^3$.

3. The apparatus of claim 1, wherein the high-pressure reactor is capable of maintaining an internal pressure of from 2000 to 3500 bar.

4. The apparatus of claim 1, wherein at least one of the connecting lines has on average an internal diameter of from 20 to 50 mm.

5. The apparatus of claim 1, wherein at least one connecting line is capable of maintaining an internal pressure of from 150 to 250 bar.

6. The apparatus of claim 1, wherein the movable piston mass weighs from 15 to 50 kg.

7. The apparatus of claim 1, wherein a connecting line through which hydraulic fluid is conveyed from the hydraulic system in the direction of the hydraulic control unit during the opening of the pressure-relief valve is fitted with a one-way restrictor.

8. The apparatus of claim 1, wherein one or more valves of the hydraulic control unit are sliding valves having ball seat actuation.

9. The apparatus of claim 1, wherein two connecting lines provided for conveying hydraulic fluid are arranged between the hydraulic control unit and the hydraulic system.

10. The apparatus of claim 1, characterized in that the pressure-relief valve is opened by moving the movable piston mass either toward or preferably away from the pressure-relief valve.

* * * * *